(12) United States Patent
Halder et al.

(10) Patent No.: US 9,073,000 B2
(45) Date of Patent: Jul. 7, 2015

(54) SEGMENTED REACTORS FOR CARBON DIOXIDE CAPTURE AND METHODS OF CAPTURING CARBON DIOXIDE USING SEGMENTED REACTORS

(75) Inventors: Amit Halder, Ithaca, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 734 days.

(21) Appl. No.: 13/420,170

(22) Filed: Mar. 14, 2012

(65) Prior Publication Data

US 2013/0243675 A1 Sep. 19, 2013

(51) Int. Cl.
| | | |
|---|---|---|
| *B01J 15/00* | (2006.01) | |
| *B01D 53/02* | (2006.01) | |
| *B01D 53/04* | (2006.01) | |
| *B01J 20/28* | (2006.01) | |
| *B01J 20/20* | (2006.01) | |
| *B01J 20/22* | (2006.01) | |

(52) U.S. Cl.
CPC ............ *B01D 53/02* (2013.01); *B01D 53/0407* (2013.01); *B01D 2253/102* (2013.01); *B01D 2253/108* (2013.01); *B01D 2253/204* (2013.01); *B01D 2253/3425* (2013.01); *B01J 20/28045* (2013.01); *Y02C 10/08* (2013.01); *B01J 20/20* (2013.01); *B01J 20/226* (2013.01)

(58) Field of Classification Search
CPC .................. B01D 2253/102; B01D 2253/108; B01D 2253/204; B01D 2253/3425; B01D 53/02; B01D 53/0407; B01J 20/20; B01J 20/226; B01J 20/28045; Y02C 10/08
See application file for complete search history.

(56) References Cited

U.S. PATENT DOCUMENTS

| 4,964,888 A | 10/1990 | Miller ............................. 55/58 |
| 5,980,612 A * | 11/1999 | Kelly ............................ 95/106 |
| 6,197,092 B1 | 3/2001 | Butwell et al. .................. 95/96 |
| 6,610,124 B1 | 8/2003 | Dolan et al. .................... 95/98 |

(Continued)

FOREIGN PATENT DOCUMENTS

| EP | 1214976 | 6/2002 |
| JP | S61227822 | 10/1986 |
| WO | 01/12961 | 2/2001 |

OTHER PUBLICATIONS

International Search Report and Written Opinion, dated Aug. 7, 2013, International Application No. PCT/US2013/030434, International filing date Mar. 12, 2013.

*Primary Examiner* — Christopher P Jones
(74) *Attorney, Agent, or Firm* — Susan S Wilks; Michael Hood

(57) ABSTRACT

A reactor for adsorbing $CO_2$ from a fluid stream includes a reactor housing having a fluid inlet and a fluid outlet. The reactor also includes an inlet ceramic honeycomb structure and an outlet ceramic honeycomb structure positioned inside the reactor housing. The inlet and outlet ceramic honeycomb structures have a plurality of partition walls extending in an axial direction thereby forming a plurality of flow channels and comprises a material that forms bonds with $CO_2$ to adsorb the $CO_2$. The inlet ceramic honeycomb structure is capable of adsorbing an inlet quantity of $CO_2$ and the outlet ceramic honeycomb structure is capable of adsorbing an outlet quantity of $CO_2$. The inlet quantity of $CO_2$ is greater than the outlet quantity of $CO_2$.

20 Claims, 5 Drawing Sheets

(56) References Cited

U.S. PATENT DOCUMENTS

| | | | |
|---|---|---|---|
| 6,652,629 B2 * | 11/2003 | Wolff et al. | 96/131 |
| 7,959,720 B2 | 6/2011 | Deckman et al. | 96/130 |
| 8,858,683 B2 | 10/2014 | Deckman | B01D 53/047 |
| 2001/0009124 A1 * | 7/2001 | Suzuki et al. | 95/113 |
| 2006/0142154 A1 * | 6/2006 | Wolff | 502/416 |
| 2007/0261557 A1 | 11/2007 | Gadkaree et al. | 96/121 |
| 2008/0282888 A1 | 11/2008 | Deckman et al. | 95/126 |
| 2009/0293720 A1 | 12/2009 | Liu | 95/92 |
| 2010/0192769 A1 * | 8/2010 | Gadkaree et al. | 95/11 |
| 2010/0212495 A1 | 8/2010 | Gadkaree et al. | 95/139 |
| 2012/0210696 A1 * | 8/2012 | Schmieg et al. | 60/274 |

\* cited by examiner

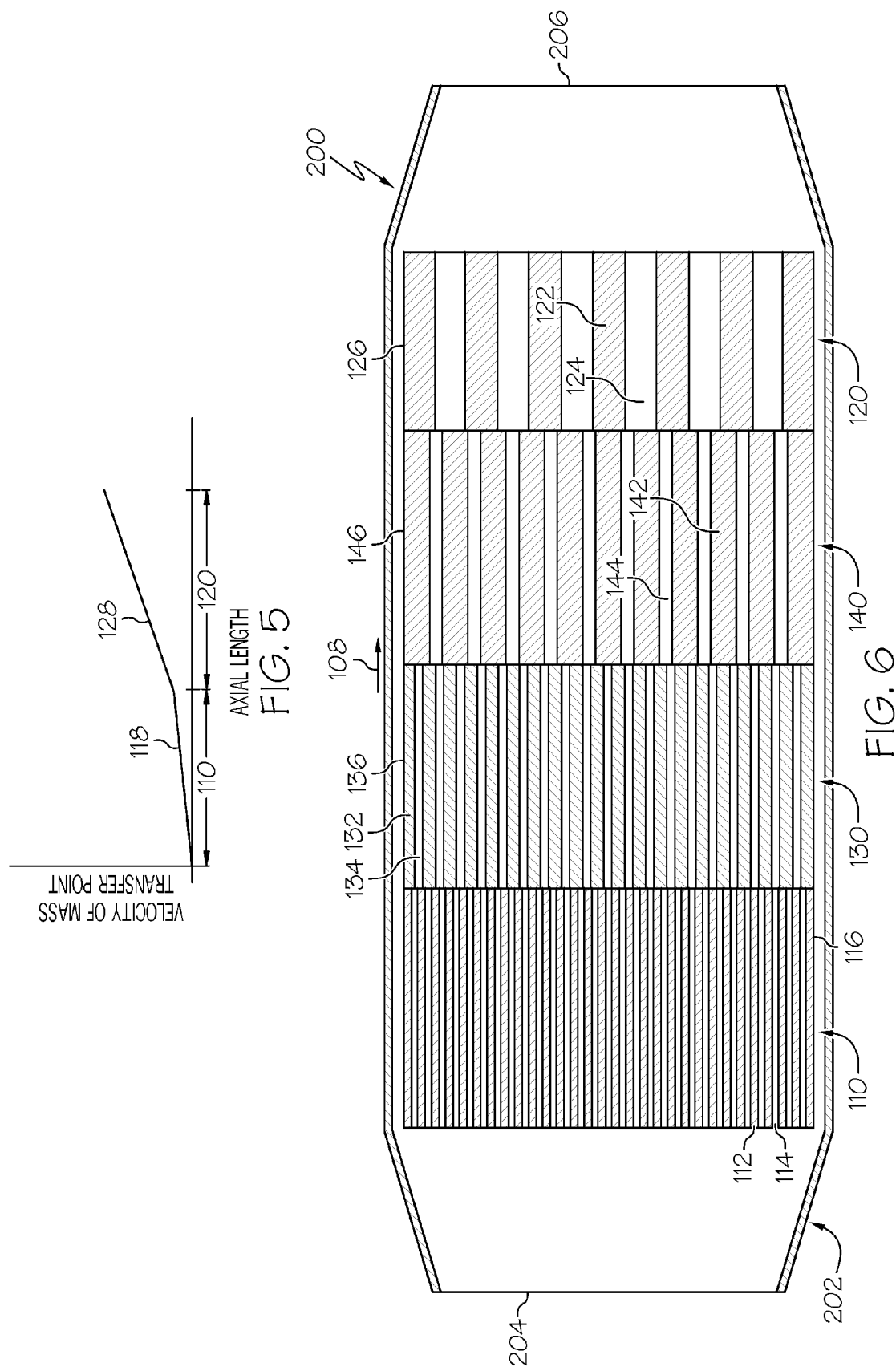

SEGMENTED REACTORS FOR CARBON DIOXIDE CAPTURE AND METHODS OF CAPTURING CARBON DIOXIDE USING SEGMENTED REACTORS

BACKGROUND

1. Field

The present specification generally relates to reactors for capturing carbon dioxide ($CO_2$) from a gas stream and, more specifically, to reactors having segmented honeycomb structures for adsorbing $CO_2$.

2. Technical Background

Natural gas is extracted from deposits to provide fuel for a variety of applications including home heating and cooking. In general, methane is the primary component of the natural gas that is used for fuel. As extracted from deposits, however, natural gas includes several other substances that are mixed with the methane extracted from the deposits. Such substances can include water, carbon dioxide ($CO_2$), hydrogen sulfide, liquid hydrocarbon condensate, and heavier gaseous hydrocarbons such as ethane, propane, and butane. Many of these substances are separated from the methane before the fuel is delivered to customers.

Various technologies are currently being used and/or developed to improve the capture of $CO_2$ from process gas streams. Such technologies include, for example, a liquid amine (MEA or KS-1) process, a chilled ammonia process, and gas membranes. While each of these technologies is effective for removing $CO_2$ from a process gas stream, each technology also has drawbacks. The chilled ammonia process is still in its early phases of development and the commercial feasibility of the process is not yet known. Some possible challenges with the chilled ammonia process include ammonia volatility and the potential contamination of the ammonia from gaseous contaminants such as $SO_x$ and $NO_x$. Various gas membrane technologies are currently employed for the removal of $CO_2$ from process gas streams. However, processes utilizing gas membrane technologies require multiple stages and/or recycling in order to achieve the desired amount of $CO_2$ separation. These multiple stages and/or recycling add significant complexity to the $CO_2$ recovery process as well as increase the energy consumption and cost associated with the process. Gas membrane technologies also typically require high pressures and associated space constraint which makes use of the technology difficult in installations with limited space such as offshore platforms.

Accordingly, a need exists for alternative methods and apparatuses which may be used to recover $CO_2$ from process gas streams.

SUMMARY

According to various embodiments, a reactor for adsorbing $CO_2$ from a fluid stream includes a reactor housing having a fluid inlet and a fluid outlet. The reactor also includes an inlet ceramic honeycomb structure positioned inside the reactor housing at a position proximate to the fluid inlet. The inlet ceramic honeycomb structure has a plurality of partition walls extending in an axial direction thereby forming a plurality of flow channels. The inlet ceramic honeycomb structure includes a material that forms bonds with $CO_2$ to adsorb the $CO_2$. The inlet ceramic honeycomb structure is capable of adsorbing an inlet quantity of $CO_2$. The reactor further includes an outlet ceramic honeycomb structure positioned inside the reactor housing at a position axially offset from the inlet ceramic honeycomb structure and proximate to the fluid outlet of the reactor housing. The outlet ceramic honeycomb structure has a plurality of partition walls extending in the axial direction thereby forming a plurality of flow channels. The outlet ceramic honeycomb structure includes a material that forms bonds with $CO_2$ to adsorb the $CO_2$. The outlet ceramic honeycomb structure is capable of adsorbing an outlet quantity of $CO_2$, and the inlet quantity of $CO_2$ is greater than the outlet quantity of $CO_2$.

According to further embodiments, a reactor for adsorbing $CO_2$ from a fluid stream includes a reactor housing having a fluid inlet and a fluid outlet. The reactor also includes an inlet ceramic honeycomb structure positioned inside the reactor housing at a position proximate to the fluid inlet. The inlet ceramic honeycomb structure has a plurality of partition walls extending in an axial direction thereby forming a plurality of flow channels and the inlet ceramic honeycomb structure includes a material that forms bonds with $CO_2$ to adsorb the $CO_2$ such that the inlet ceramic honeycomb structure has an inlet mass transfer velocity. The reactor further includes an outlet ceramic honeycomb structure positioned inside the reactor housing at a position axially offset from the inlet ceramic honeycomb structure and proximate to the fluid outlet of the reactor housing. The outlet ceramic honeycomb structure has a plurality of partition walls extending in the axial direction thereby forming a plurality of flow channels. The outlet ceramic honeycomb structure includes a material that forms bonds with $CO_2$ to adsorb the $CO_2$ such that the outlet ceramic honeycomb structure has an outlet mass transfer velocity. For a constant mass flow rate of a fluid stream containing $CO_2$, the inlet mass transfer velocity is greater than the outlet mass transfer velocity.

According to still further embodiments, the disclosure provides a method of removing $CO_2$ from a fluid stream that includes introducing the fluid stream to a reactor, where the reactor comprises a reactor housing having a fluid inlet and a fluid outlet, an inlet ceramic honeycomb structure positioned inside the reactor housing at a position proximate to the fluid inlet of the reactor housing, and an outlet ceramic honeycomb structure positioned inside the reactor housing at a position axially offset from the inlet ceramic honeycomb structure and proximate to the fluid outlet of the reactor housing. The inlet ceramic honeycomb structure and the outlet ceramic honeycomb structure have a plurality of partition walls extending in an axial direction thereby forming a plurality of flow channels and comprise a material that forms bonds with $CO_2$ to adsorb the $CO_2$. The inlet and outlet ceramic honeycomb structures include material that forms bonds with $CO_2$ to adsorb the $CO_2$, such that the inlet and the outlet ceramic honeycomb structures are capable of adsorbing an inlet quantity and an outlet quantity of $CO_2$, respectively. The inlet quantity of $CO_2$ is greater than the outlet quantity of $CO_2$. The method also includes flowing the fluid stream from the fluid inlet to the fluid outlet of the reactor housing such that the fluid stream flows through the inlet ceramic honeycomb structure and the outlet ceramic honeycomb structure, where the inlet ceramic honeycomb structure and the outlet ceramic honeycomb structure have an affinity for $CO_2$. The method further includes sensing a chemical composition of a portion of the fluid stream flowing out of the fluid outlet of the reactor housing, and terminating the fluid stream from flowing into the reactor when $CO_2$ breakthrough is sensed.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5 diagrammatically depicts velocity of a mass transfer point in a reactor for $CO_2$ capture having a plurality of ceramic honeycomb substrates according to one or more embodiments shown and described herein;

FIG. 6 schematically depicts a side sectional view along line A-A of FIG. 1 of a reactor for $CO_2$ capture having a plurality of ceramic honeycomb substrates according to one or more embodiments shown and described herein.

DETAILED DESCRIPTION

Figure 1:
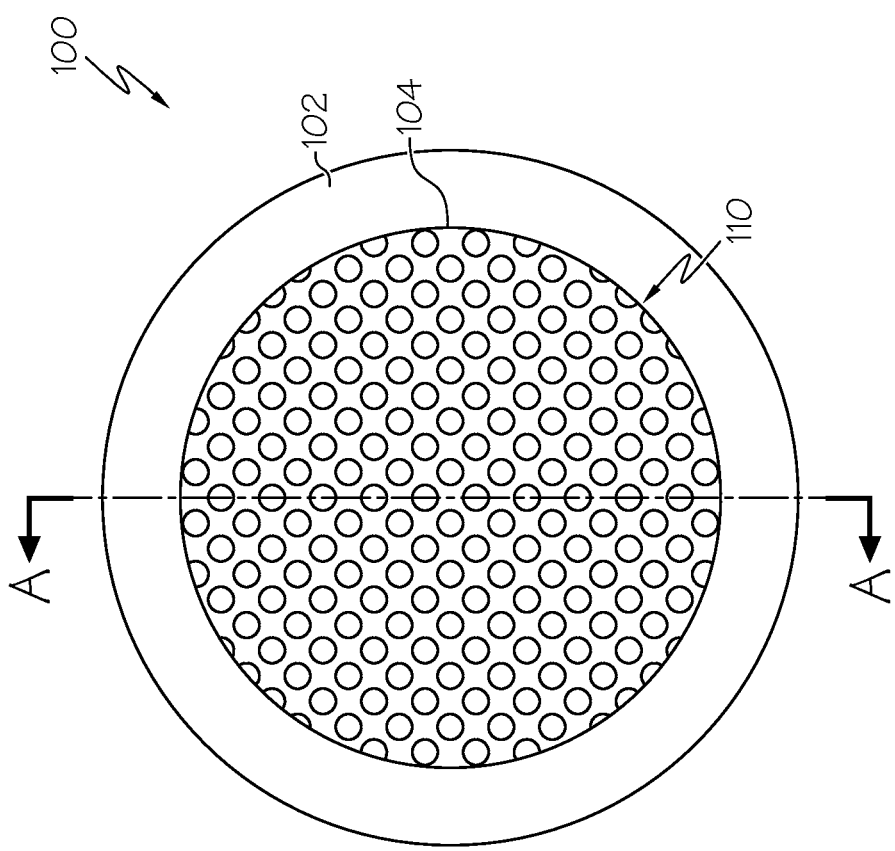
FIG. 1 schematically depicts a front view view of a reactor for $CO_2$ capture having a plurality of ceramic honeycomb substrates according to one or more embodiments shown and described herein.
Figure 2:
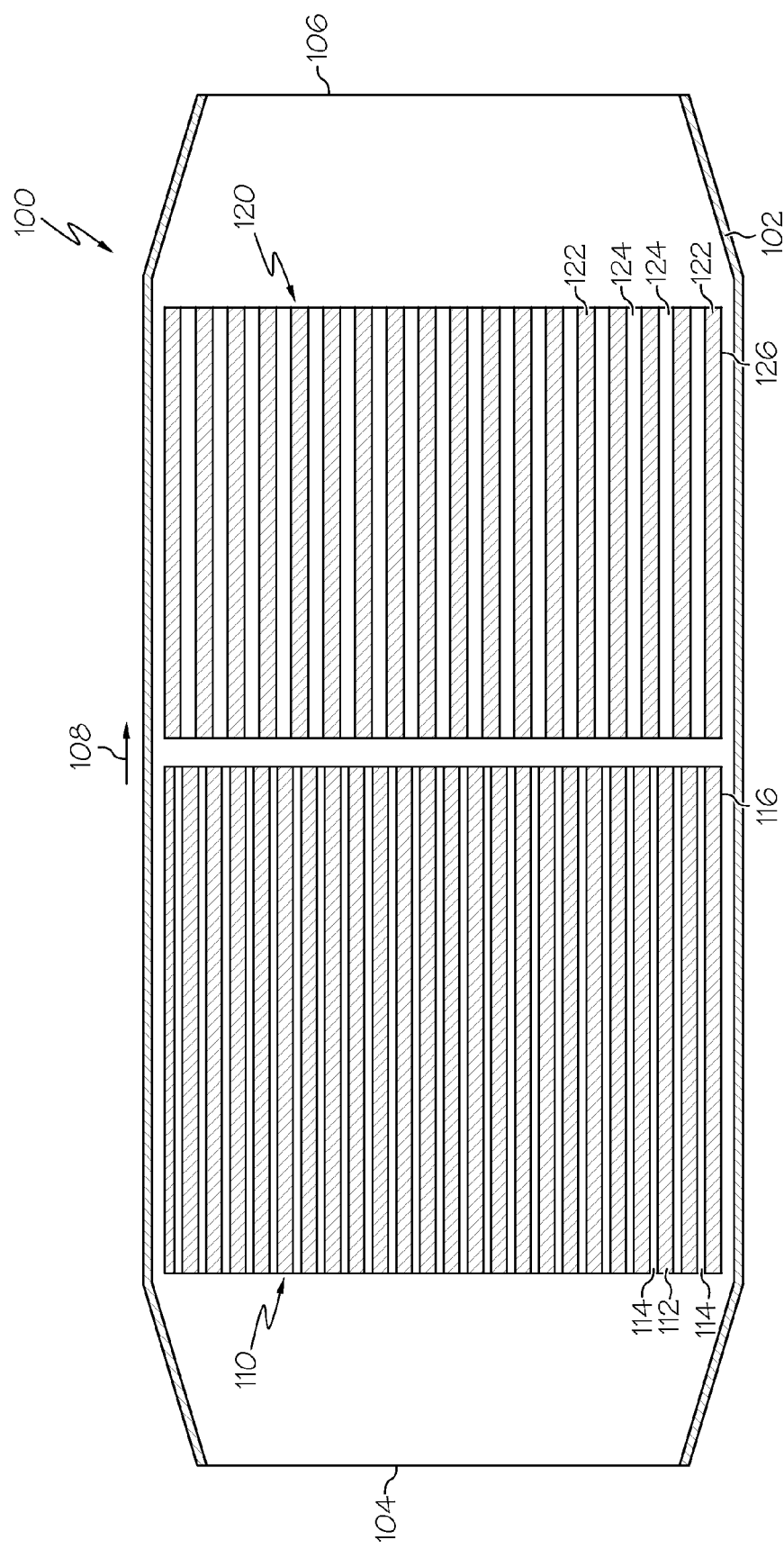
FIG. 2 schematically depicts a side sectional view along line A-A of FIG. 1 of a reactor for $CO_2$ capture having a plurality of ceramic honeycomb substrates according to one or more embodiments shown and described herein.

Reference will now be made in detail to embodiments of reactors having segmented ceramic honeycomb structures for capturing $CO_2$, examples of which are illustrated in the accompanying drawings. Whenever possible, the same reference numerals will be used throughout the drawings to refer to the same or like parts. One example of the reactor for capturing $CO_2$ from a fluid stream is schematically depicted in FIGS. 1 and 2. The reactor generally includes a reactor housing having a fluid inlet and a fluid outlet, an inlet ceramic honeycomb structure positioned inside the reactor proximate to the fluid inlet, and an outlet ceramic honeycomb structure positioned inside the reactor proximate to the fluid outlet. The inlet ceramic honeycomb structure and the outlet ceramic honeycomb structure include a material that forms bonds with $CO_2$ to adsorb $CO_2$ from the fluid stream. The inlet ceramic honeycomb structure adsorbs an inlet quantity of $CO_2$ and the outlet ceramic honeycomb structure adsorbs an outlet quantity of $CO_2$, where the inlet quantity is greater than the outlet quantity. Reactors according to the current disclosure may exhibit enhanced efficiency of utilization of adsorbent material as compared with reactors having uniform distribution of adsorbent material. The reactors and methods of capturing $CO_2$ will be described in more detail herein with specific reference to the appended drawings.

Referring now to FIGS. 1 and 2, a reactor 100 is depicted. The reactor 100 includes a reactor housing 102 having a fluid inlet 104 and a fluid outlet 106 positioned distally from the fluid inlet 104. A fluid stream is introduced to the reactor 100 at the fluid inlet 104 and exits at the fluid outlet 106. The reactor 100 includes an inlet ceramic honeycomb structure 110 positioned inside the reactor housing 102 at a position proximate to the fluid inlet 104. The inlet ceramic honeycomb structure 110 includes a plurality of partition walls 112 extending in an axial direction 108. The plurality of partition walls 112 form a plurality of flow channels 114, similarly extending in the axial direction 108. The partition walls 112 may be formed in an extrusion process, such that the flow channels 114 have approximately the same dimensions at all positions along the axial direction 108. The inlet ceramic honeycomb structure 110 may also include a skin layer 116 surrounding the plurality of flow channels 114. The skin layer 116 may be formed during the formation of the partition walls 112 or formed in later processing as an after-applied skin layer, such as applying skinning cement to the outer peripheral portion of the flow channels 114.

The reactor 100 also includes an outlet ceramic honeycomb structure 120 positioned inside the reactor housing 102 at a position proximate to the fluid outlet 106. In the embodiment depicted in FIG. 2, the outlet ceramic honeycomb structure 120 is axially offset from the inlet ceramic honeycomb structure 110. The outlet ceramic honeycomb structure 120 includes a plurality of partition walls 122 extending in the axial direction 108. The plurality of partition walls 122 form a plurality of flow channels 124, similarly extending in the axial direction 108. Further, the outlet ceramic honeycomb structure 120 may include a skin layer 126 surrounding the plurality of flow channels 124.

The plurality of flow channels 114, 124 in the inlet and outlet ceramic honeycomb structures 110, 120, respectively, may have a variety of shapes including having cross sections that are square, rectangular, round, oblong, triangular, octagonal, hexagonal, or combinations thereof. The flow channels 114, 124 extend along the length of the inlet or outlet ceramic honeycomb structures 110, 120, such that a fluid stream introduced to the reactor 100 contacts the flow channels 114, 124 along the length of the inlet and outlet ceramic honeycomb structures 110, 120. In embodiments described herein, the inlet and outlet ceramic honeycomb structures 110 may be formed with a channel density of up to about 1600 channels per square inch (cpsi). For example, in some embodiments, the inlet and outlet ceramic honeycomb structures 110, 120 may have a channel density in a range from about 100 cpsi to about 2000 cpsi. In some embodiments, the inlet and the outlet ceramic honeycomb structures 110, 120 may have different channel densities. For example, in one embodiment, the inlet ceramic honeycomb structure 110 may be formed with an inlet cell density in a range from about 900 to about 2000 cpsi, and the outlet ceramic honeycomb structure 120 may be formed with an outlet cell density in a range from about 100 to about 900 cpsi. As such, the amount of $CO_2$ adsorbing material in the inlet ceramic honeycomb structure 110 is greater than the amount of $CO_2$ adsorbing material in the outlet ceramic honeycomb structure 120.

In some embodiments, the channel size and the channel density can be varied between the inlet and outlet ceramic honeycomb structures 110, 120 to provide a reactor 100 having the desired pressure drop from the fluid inlet 104 to the fluid outlet 106. For example, the inlet ceramic honeycomb structure 110 may have dimensionally smaller flow channels 114 than the outlet ceramic honeycomb structure 120, which results in an inlet pressure drop. The comparatively larger flow channels 124 of the outlet ceramic honeycomb structure 120 may decrease the pressure drop across the outlet ceramic honeycomb structure 120, which results in an outlet pressure drop. The inlet pressure drop may be greater than the outlet pressure drop for the same mass flow rate of the fluid stream across both the inlet and the outlet ceramic honeycomb structures 110, 120.

The inlet ceramic honeycomb structure 110 and the outlet ceramic honeycomb structure 120 include a material that forms bonds with $CO_2$, while allowing other components in the fluid stream to pass without bonding with the inlet ceramic honeycomb structure 110 and the outlet ceramic honeycomb structure 120. Such materials may form partition walls 112, 122 that have pores, thereby increasing the surface area of each of the flow channels 114, 124 as compared with the overall geometric dimensions of each of the flow channels 114, 124. In some embodiments, the inlet and outlet ceramic honeycomb structures 110, 120 are made from materials that are adapted to adsorb $CO_2$ from the fluid stream. Such materials are suitable for adsorbing $CO_2$ from the fluid stream and may include, without limitation, molecular sieve materials having framework structures such as MFI, MOR, ISV, ITE, CHA, DDR, FAU, and/or LTA framework structures and similar materials. Exemplary materials include, without limitation, ZSM5 zeolite which has an MFI framework structure, and Mordenite which has an MOR framework structure. The sorbent materials may also include sorbents based on activated carbon or carbon molecular sieve materials. Alternatively, the sorbent material may be selected from a metallic organic framework (MOF) family such as MOF-5, MOF-177, MOF-505, MOF-74 or zeolitic imidazole framework structures (ZIFs) including, without limitation, ZIF-68, ZIF-69, ZIF-7, ZIF-9, ZIF-11 and ZIF-90. Suitable sorbent materials may also include any of the aforementioned materials functionalized with a polymer having an amine or amino group that are mixed with the ceramic to further enhance the adsorption capacity of the material.

In some embodiments, the inlet and outlet ceramic honeycombs 110, 120 may be made from a ceramic substrate material to which a functional coating adapted to adsorb $CO_2$ from the fluid stream is applied. Such ceramic substrate materials include, for example, cordierite, aluminum titanate, and silicon carbide, in addition to the materials listed above that are adapted to adsorb $CO_2$. Examples of such materials that may be used as the functional coating include, without limitation, molecular sieve materials having framework structures such as MFI, MOR, ISV, ITE, CHA, DDR, FAU, and/or LTA framework structures and similar materials. Exemplary materials include, without limitation, ZSM5 zeolite which has an MFI framework structure, and Mordenite which has an MOR framework structure. The sorbent materials may also include sorbents based on activated carbon or carbon molecular sieve materials. Alternatively, the sorbent material may be selected from a metallic organic framework (MOF) family such as MOF-5, MOF-177, MOF-505, MOF-74 or zeolitic imidazole framework structures (ZIFs) including, without limitation, ZIF-68, ZIF-69, ZIF-7, ZIF-9, ZIF-11 and ZIF-90. Suitable sorbent materials may also include any of the aforementioned materials functionalized with a polymer having an amine or amino group that are mixed into the functional coating to further enhance the adsorption capacity of the functional coating.

The functional coating may be applied onto the partition walls 112, 122 of the inlet and outlet ceramic honeycomb structures 110, 120 by a washcoating process such that the functional coating surrounds the flow channels 114, 124 of the inlet and outlet ceramic honeycomb structures 110, 120. The functional coating may be deposited onto the partition walls 112, 122 by first forming a slurry containing the functional coating in a liquid vehicle, such as water. The inlet and outlet ceramic honeycomb structures 110, 120 may be submerged in the slurry to allow the slurry to infiltrate the inlet and outlet ceramic honeycomb structures 110, 120. More specifically, the slurry enters the flow channels 114, 124 and permeates through at least a portion of the partition walls 112, 122, thereby depositing functional coating into pores of the partition walls 112, 122.

While specific mention is made above to inlet and outlet ceramic honeycomb structures 110, 120 being made from a material adapted to adsorb $CO_2$ or being coated with a material adapted to adsorb $CO_2$, it should be understood that the inlet and outlet ceramic honeycomb structures 110, 120 may each be made using different materials and different manufacturing techniques that provide inlet and outlet ceramic honeycomb structures 110, 120 that adsorb $CO_2$.

It should also be understood that a variety of manufacturing methods may be employed to form ceramic honeycomb structures where more $CO_2$ adsorbing material is present at positions proximate to the fluid inlet 104 than at positions proximate to the fluid outlet 106. Such manufacturing methods may include multiple washcoating processes to increase the $CO_2$ adsorbing material in local regions of the ceramic honeycomb structures, for example by increasing the thickness of the $CO_2$ adsorbent functional coating applied in the washcoating process. Further, rapid manufacturing techniques such as stereolithography, selective laser sintering, electron beam melting, 3D printing, or the like, may be used to form ceramic honeycomb structures having partition walls that vary in thickness and/or in orientation along their lengths. In some embodiments, the inlet and outlet ceramic honeycomb structures 110, 120 may be discrete components. In other embodiments, the inlet and outlet ceramic honeycomb structures 110, 120 may be continuous components that are affixed to one another or manufactured as an integral component. In general, manufacturing costs and/or difficulty of producing ceramic honeycomb structures increase with increasing adsorption of $CO_2$. Accordingly, a reactor 100 that captures a desired quantity of $CO_2$ while incorporating outlet ceramic honeycomb structures 120 that are low cost may be desired.

As discussed hereinabove, a fluid stream containing $CO_2$ is introduced to the reactor 100 that includes the inlet ceramic honeycomb structure 110 and the outlet ceramic honeycomb structure 120. The inlet and outlet ceramic honeycomb structures 110, 120 adsorb the $CO_2$ from the fluid stream until becoming saturated with $CO_2$. The point of saturation of the inlet and outlet ceramic honeycomb structures 110, 120 progresses in the axial direction 108 until both of the inlet and outlet ceramic honeycomb structures 110, 120 are saturated, at which point no additional $CO_2$ is adsorbed by the reactor, or until the fluid stream is diverted away from the reactor 100.

When saturated with $CO_2$, the inlet ceramic honeycomb structure 110 adsorbs an inlet quantity of $CO_2$. Similarly, when saturated with $CO_2$, the outlet ceramic honeycomb structure 120 adsorbs an outlet quantity of $CO_2$. Reactors 100 incorporating inlet ceramic honeycomb structures 110 and outlet ceramic honeycomb structures 120 according to the present disclosure have inlet quantities that are greater than outlet quantities.

Figure 3:
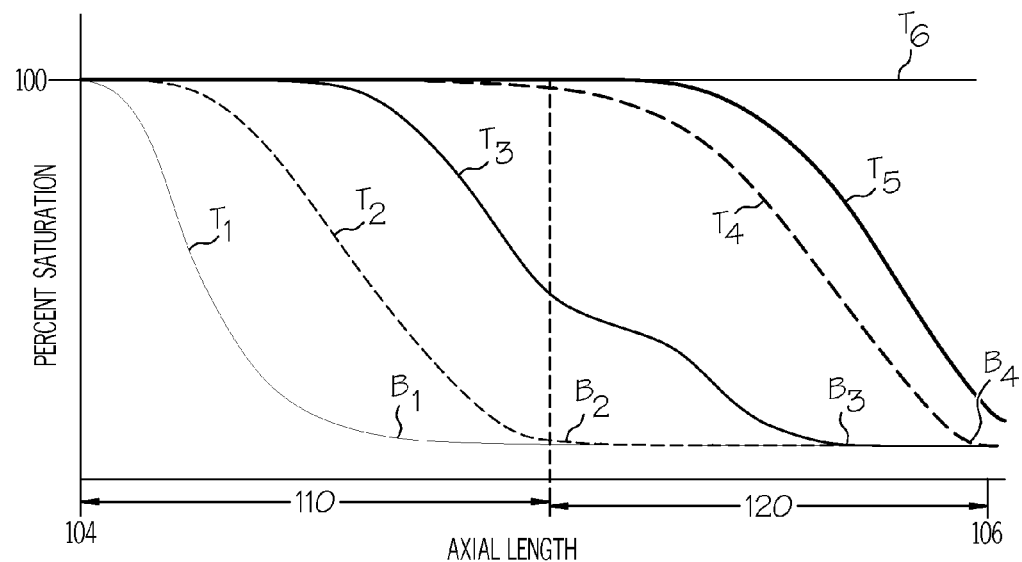
FIG. 3 diagrammatically depicts saturation levels of a reactor for $CO_2$ capture having a plurality of ceramic honeycomb substrates according to one or more embodiments shown and described herein.

Referring now to FIG. 3, a diagrammatical representation of the saturation levels at increasing time is depicted of the reactor having inlet and outlet ceramic honeycomb structures 110, 120. With increasing time, the inlet and outlet ceramic honeycomb structures 110, 120 adsorb an increasing amount of $CO_2$ from a fluid stream. The region of the inlet and/or outlet ceramic honeycomb structures 110, 120 in which $CO_2$ is adsorbed is referred to herein as the "mass transfer zone." The position of the mass transfer zone that is furthest from the fluid inlet 104 in the axial direction 108 is referred to herein as the "mass transfer point," and is depicted as mass transfer points $B_1$-$B_4$ in FIG. 3. A "breakthrough point" represents the mass transfer point ($B_4$) as it reaches the end of the outlet ceramic honeycomb structure 120 proximate to the fluid outlet 106. After the mass transfer point reaches the end of the outlet ceramic honeycomb structure 120 proximate to the fluid outlet 106, $CO_2$ levels in the fluid stream measured at the fluid outlet 106 may be above the ambient levels of $CO_2$.

At time $t_1$, all of the $CO_2$ from the fluid stream is adsorbed within the inlet ceramic honeycomb structure 110. At time $t_1$, the mass transfer point $B_1$ is positioned within the inlet ceramic honeycomb structure 110. The fluid stream continues to flow through the reactor 100 and continues to be adsorbed by the inlet ceramic honeycomb structure 110. At time $t_2$, the mass transfer point $B_2$ has traveled through the inlet ceramic honeycomb structure 110 into the outlet ceramic honeycomb structure 120. At time $t_2$, the outlet ceramic honeycomb structure 120 beings to adsorb $CO_2$ from the fluid stream in conjunction with the unsaturated portion of the inlet ceramic honeycomb structure 110.

At time $t_3$, the mass transfer point $B_3$ is positioned further into the outlet ceramic honeycomb structure 120 than at time $t_2$. Note that at time $t_3$, portions of the inlet ceramic honeycomb structure 110 positioned proximate to the fluid inlet 104 have approached saturation with $CO_2$. These portions of the inlet ceramic honeycomb structure 110, therefore, no longer are adsorbing $CO_2$ from the fluid stream. Correspondingly, addition portions of the outlet ceramic honeycomb structure 120 adsorb $CO_2$ from the fluid stream passing through the reactor 100.

At time $t_4$, the mass transfer point $B_4$ is positioned at and end of the outlet ceramic honeycomb structure 120 proximate to the fluid outlet 106 of the reactor. After time $t_4$, as the inlet and outlet ceramic honeycomb structure 110, 120 continue to approach saturation, the fluid stream exiting the reactor 100 beings to exhibit the presence of $CO_2$. Time $t_4$ is referred to herein as the "breakthrough time," or the time at which the mass transfer zone has traveled through the inlet and outlet ceramic honeycomb structures 110, 120, and the inlet and outlet ceramic honeycomb structures 110, 120 can no longer adsorb all of the $CO_2$ in the fluid stream.

At time $t_5$, portions of the outlet ceramic honeycomb structure 120 positioned proximate to the fluid inlet 104 continue to approach saturation. The inlet and outlet ceramic honeycomb structures 110, 120 cannot adsorb all of the $CO_2$ from the fluid stream that flows through the reactor 100, so the level of $CO_2$ in the fluid stream exiting the reactor 100 continues to increase. At time $t_6$, all of the inlet and outlet ceramic honeycomb structures 110, 120 have become saturated with $CO_2$ such that none of the inlet and outlet ceramic honeycomb structures 110, 120 can adsorb $CO_2$ from the fluid stream. At time $t_6$, the $CO_2$ concentration of the fluid stream entering the reactor 100 is substantially the same as the $CO_2$ concentration of the fluid stream exiting the reactor 100.

Figure 4:
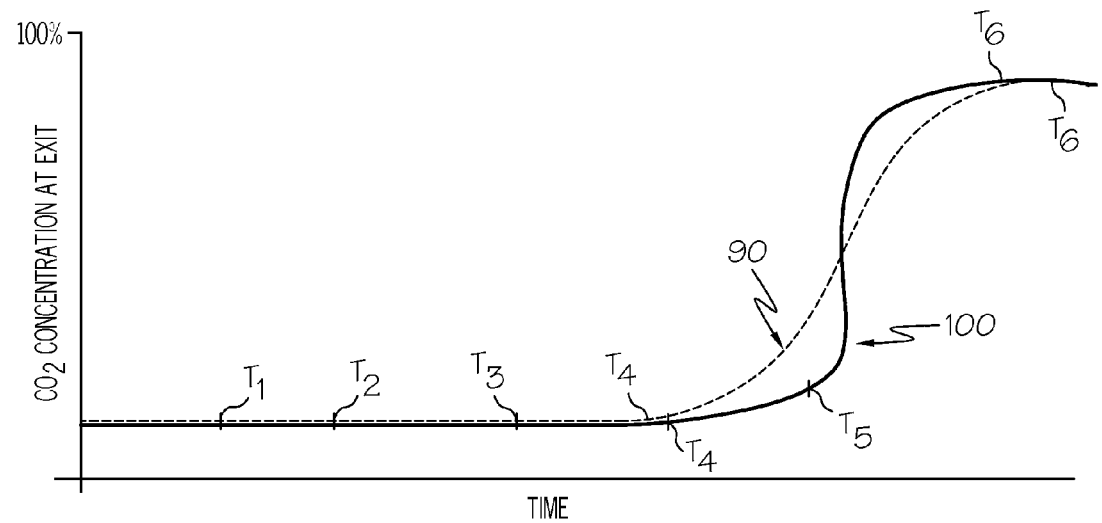
FIG. 4 diagrammatically depicts $CO_2$ concentration levels of a reactor for $CO_2$ capture having a plurality of ceramic honeycomb substrates according to one or more embodiments shown and described herein.

The $CO_2$ concentration of the fluid stream evaluated at the fluid outlet 106 of the reactor 100 is schematically depicted in FIG. 4. As depicted, the $CO_2$ concentration of the fluid stream approaches zero for times $t_1$ through $t_4$, as the inlet and outlet ceramic honeycomb structures 110, 120 adsorb the $CO_2$ from the fluid stream in substantial portion. At time $t_4$, the breakthrough time, the mass transfer point $B_4$ reaches the end of the outlet ceramic honeycomb structure 120 positioned proximate to the fluid outlet 106 of the reactor. After time $t_4$, $CO_2$ concentration in the fluid stream exiting the reactor 100 beings to increase. The $CO_2$ concentration in the fluid stream continues to increase until time $t_6$, at which point all of the inlet and outlet ceramic honeycomb structures 110, 120 have become saturated with $CO_2$, and the $CO_2$ concentration of the fluid stream entering the reactor 100 is substantially the same as the $CO_2$ concentration of the fluid stream exiting the reactor 100.

The relative efficiency of adsorption of $CO_2$ from the fluid stream by the reactor may be gauged by the incline of the curve representing $CO_2$ concentration of the fluid stream measured as the fluid stream exits the reactor 100. In general, the steeper the curve representing $CO_2$ concentration, the more efficient the use of material for adsorbing $CO_2$ in the reactor 100. For example, compare the steepness of the curve representing the reactor 100 with a baseline reactor 90 having an equivalent quantity of $CO_2$ adsorbing material that is uniformly distributed along its length. The baseline reactor 90 has a breakthrough time $t_4$ that is earlier than the reactor 100 of the present disclosure. Thus, if the end-user application takes a reactor off-line at the breakthrough time $t_4$, the reactor 100 of the present disclosure can stay on-line longer than the baseline reactor. In addition, still comparing reactor 100 to the baseline reactor 90, time $t_6$ is closer to time t4 for reactor 100 than for baseline reactor 90. Similarly, the curve representing $CO_2$ concentration is steeper for reactor 100 than for baseline reactor 90. Both a relatively smaller time between times $t_4$ and $t_6$, along with a relatively steep curve representing $CO_2$ concentration may denote that the material for adsorbing $CO_2$ in the reactor 100 is being efficiently used, as a greater portion of the material can be saturated.

Referring now to FIG. 5, the velocity of the mass transfer point moving through the inlet and outlet ceramic honeycomb structures 110, 120 of the reactor 100 for a constant mass flow rate of $CO_2$ is depicted. The inlet ceramic honeycomb structure 110 has an inlet mass transfer velocity 118, and the outlet ceramic honeycomb structure 120 has an outlet mass transfer velocity 128. Because the inlet ceramic honeycomb structure 110 has more $CO_2$ adsorbing material than the outlet ceramic honeycomb structure, the inlet ceramic honeycomb structure 110 adsorbs more $CO_2$ than the outlet ceramic honeycomb structure 120. Accordingly, the mass transfer point moves less through the inlet ceramic honeycomb structure 110 than through the outlet ceramic honeycomb structure 120. Thus, the inlet mass transfer velocity 118 is less than the outlet mass transfer velocity 128.

While the discussion hereinabove has been directed to evaluating reactors 100 based on full saturation of the inlet and outlet ceramic honeycomb structures 110, 120, it should be understood that some end-user application may disable a reactor 100 at the breakthrough time $t_4$, wherein breakthrough of the mass transfer zone occurs. Disabling a reactor 100 at such a time may prevent the fluid stream from containing significant concentrations of $CO_2$ after passing through the reactor. However, although the fluid stream does not fully saturate the inlet and outlet ceramic honeycomb structures 110, 120 of the reactors 100, efficiency of the reactors 100 can be evaluated according to the procedures discussed hereinabove with respect to fully saturating the inlet and outlet ceramic honeycomb structures 110, 120.

A reactor 100 according to the present disclosure that includes an inlet ceramic honeycomb structure 110 having more $CO_2$ adsorbing material than an outlet ceramic honeycomb structure 120 may adsorb more $CO_2$ than a comparable baseline reactor 90 that has a uniform distribution of the same quantity of $CO_2$ adsorbing material along the length of the baseline reactor 90. The reactor 100 according to the present disclosure may adsorb an amount of $CO_2$ that is closer to the saturation amount of all of the ceramic honeycomb structures than the baseline reactor 90. Restated, the reactor 100 according to the present disclosure may incorporate the same quantity of $CO_2$ adsorbing material in the baseline reactor 90, but the reactor 100 according to the present disclosure may use the $CO_2$ adsorbing material more efficiently that the baseline reactor 90.

Referring now to FIG. 6, another embodiment of the reactor 200 is depicted. Similar to the reactor 100 described with respect to FIG. 2 hereinabove, the reactor 200 depicted in FIG. 6 includes a reactor housing 202 having a fluid inlet 204 and a fluid outlet 206 positioned distally from the fluid inlet 204. A fluid stream is introduced to the reactor 200 at the fluid inlet 204 and exits at the fluid outlet 206. The reactor 200 includes an inlet ceramic honeycomb structure 110 positioned inside the reactor housing 202 at a position proximate to the fluid inlet 204. The inlet ceramic honeycomb structure 110 includes a plurality of partition walls 112 extending in an axial direction 108. The plurality of partition walls 112 form a plurality of flow channels 114, similarly extending in the axial direction 108. The partition walls 112 may be formed in an extrusion process, such that the flow channels 114 have approximately the same dimensions at all positions along the axial direction 108. The inlet ceramic honeycomb structure 110 may also include a skin layer 116 surrounding the plurality of flow channels 114. The skin layer 116 may be formed during the formation of the partition walls 112 or formed in later processing as an after-applied skin layer, such as applying skinning cement to the outer peripheral portion of the flow channels 114.

The reactor 200 includes an outlet ceramic honeycomb structure 120 positioned inside the reactor housing 202 at a position proximate to the fluid outlet 206. The outlet ceramic honeycomb structure 120 includes a plurality of partition walls 122 extending in the axial direction 108. The plurality of partition walls 122 form a plurality of flow channels 124, similarly extending in the axial direction 108. Further, the outlet ceramic honeycomb structure 120 may include a skin layer 126 surrounding the plurality of flow channels 124.

The reactor 200 includes a first intermediate ceramic honeycomb structure 130 positioned inside the reactor housing 202 at an axial position between the inlet ceramic honeycomb structure 110 and the outlet ceramic honeycomb structure 120. The first intermediate ceramic honeycomb structure 130 includes a plurality of partition walls 132 extending in the axial direction 108. The plurality of partition walls 132 form a plurality of flow channels 134, similarly extending in the axial direction 108. Further, the first intermediate ceramic honeycomb structure 130 may include a skin layer 136 surrounding the plurality of flow channels 134.

The reactor 200 may also include a second intermediate ceramic honeycomb structure 140 positioned inside the reactor housing 202 at an axial position between the first intermediate ceramic honeycomb structure 130 and the outlet ceramic honeycomb structure 120. The second intermediate ceramic honeycomb structure 140 includes a plurality of partition walls 142 extending in the axial direction 108. The plurality of partition walls 142 form a plurality of flow channels 144, similarly extending in the axial direction 108. Further, the second intermediate ceramic honeycomb structure 140 may include a skin layer 146 surrounding the plurality of flow channels 144.

Consistent with the inlet and outlet ceramic honeycomb structures 110, 120, the plurality of flow channels 134, 144 of the first and second intermediate ceramic honeycomb structures 130, 140, respectively, may have a variety of shapes including having cross sections that are square, rectangular, round, oblong, triangular, octagonal, hexagonal, or combinations thereof. The flow channels 134, 144 extend along the length of the first or second intermediate honeycomb structures 130, 140, such that a fluid stream introduced to the reactor 100 contacts the flow channels 114, 134, 144, 124 along the length of the inlet, first intermediate, second intermediate, and outlet ceramic honeycomb structures 110, 130, 140, 120.

In embodiments described herein, the inlet, first intermediate, second intermediate, and outlet ceramic honeycomb structures 110, 130, 140, 120 may be formed with a channel density of up to about 1600 channels per square inch (cpsi). For example, in some embodiments, the inlet and outlet ceramic honeycomb structures 110, 120 may have a channel density in a range from about 100 cpsi to about 2000 cpsi. In some embodiments, the inlet, the first intermediate, the second intermediate, and the outlet ceramic honeycomb structures 110, 130, 140, 120 may have different channel densities. For example, in one embodiment, the inlet ceramic honeycomb structure 110 may be formed with a channel density in a range from about 900 to about 2000 cpsi, the first intermediate ceramic honeycomb structure 130 may be formed with a channel density in a range from about 500 cpsi to about 1500 cpsi, the second intermediate ceramic honeycomb structure may be formed with a channel density in a range from about 200 to about 1000, and the outlet ceramic honeycomb structure 120 may be formed with a channel density in a range from about 100 to about 900 cpsi. As such, the amount of $CO_2$ adsorbing material in the inlet ceramic honeycomb structure 110 is greater than the amount of $CO_2$ adsorbing material in the first intermediate ceramic honeycomb structure 130, which is greater than the amount of $CO_2$ adsorbing material in the second intermediate ceramic honeycomb structure 140, which is greater than the amount of $CO_2$ adsorbing material in the outlet ceramic honeycomb structure 120.

In addition, the inlet, first intermediate, second intermediate, and outlet ceramic honeycomb structures 110, 130, 140, 120 include a material that forms bonds with $CO_2$, while allowing other components in the fluid stream to pass without bonding with the inlet first intermediate, second intermediate, and outlet ceramic honeycomb structures 110, 130, 140, 120. In other embodiments, the material may be a functional coating that is applied onto the inlet first intermediate, second intermediate, and outlet ceramic honeycomb structures 110, 130, 140, 120, which act as a substrate, positioning the functional coating within the reactor 100 as to capture $CO_2$ from the fluid stream. Examples of such materials that may be included in these applications are listed hereinabove.

When saturated with $CO_2$, the inlet ceramic honeycomb structure 110 adsorbs an inlet quantity of $CO_2$. When saturated with $CO_2$, the first intermediate ceramic honeycomb structure 130 adsorbs a first intermediate quantity of $CO_2$. When saturated with $CO_2$, the second intermediate ceramic honeycomb structure 140 adsorbs a second intermediate quantity of $CO_2$. When saturated with $CO_2$, the outlet ceramic honeycomb structure 120 adsorbs an outlet quantity of $CO_2$. Reactors 100 incorporating inlet, first intermediate, second intermediate, and outlet ceramic honeycomb structures 110, 130, 140, 120 according to the present disclosure have inlet quantities that are greater than first intermediate quantities, which are greater than second intermediate quantities, which are greater than outlet quantities.

The reactor 200 having inlet, first intermediate, second intermediate, and outlet ceramic honeycomb structures 110, 130, 140, 120, as depicted in FIG. 6, operates with the same principles as discussed hereinabove in regard to the reactor 100 having inlet and outlet ceramic honeycomb structures 110, 120. The inlet, first intermediate, second intermediate, and outlet ceramic honeycomb structures 110, 130, 140, 120 sequentially adsorb $CO_2$ as the fluid stream passes from the fluid inlet 204 to the fluid outlet 206. The inlet, first intermediate, second intermediate, and outlet ceramic honeycomb structures 110, 130, 140, 120 will each continue to adsorb $CO_2$ from the fluid stream until saturated with $CO_2$.

The flow channels 114, 134, 144, 124 of the inlet, first intermediate, second intermediate, and outlet ceramic honeycomb structures 110, 130, 140, 120 may be sized to provide the desired pressure drop for the fluid stream passing through the reactor. For example, the first inlet pressure drop of the inlet ceramic honeycomb structure 110 may be greater than the first intermediate pressure drop of the first intermediate ceramic honeycomb structure 130, which may be greater than the second intermediate pressure drop of the second intermediate ceramic honeycomb structure 140, which may be greater than the outlet pressure drop of the outlet ceramic honeycomb structure 120.

Figure 7:
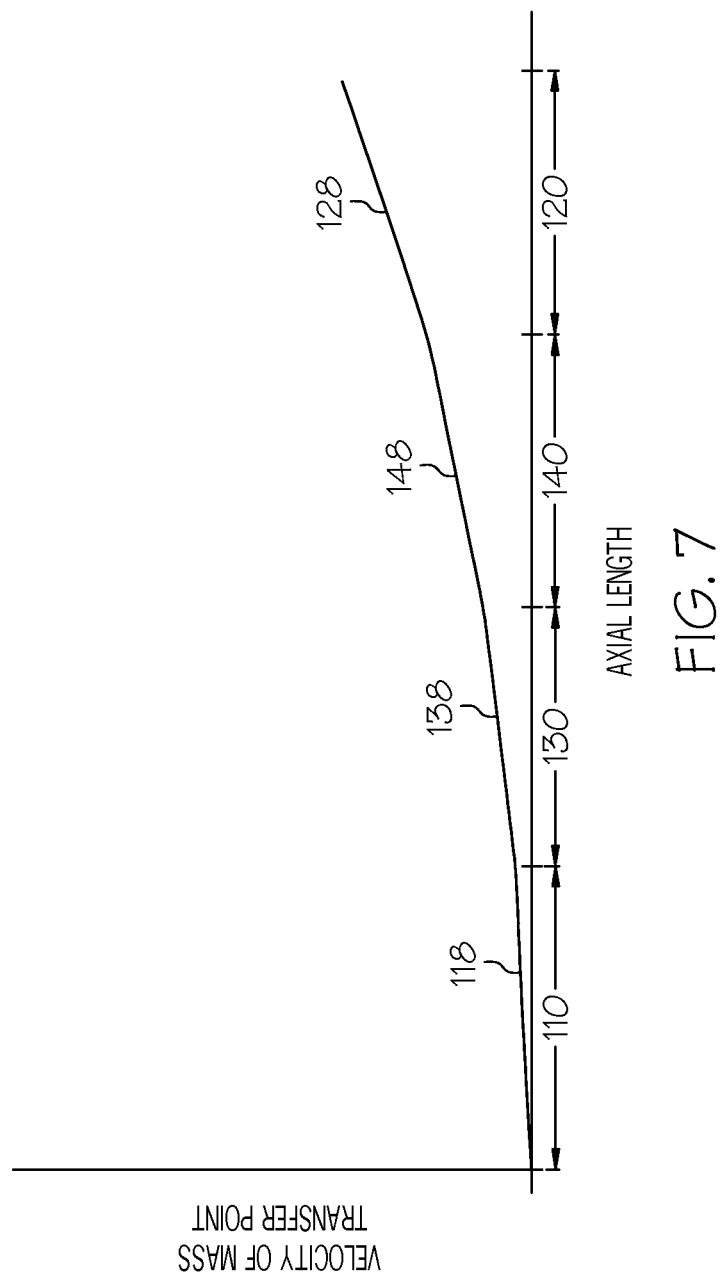
FIG. 7 diagrammatically depicts velocity of a mass transfer point in a reactor for $CO_2$ capture having a plurality of ceramic honeycomb substrates according to one or more embodiments shown and described herein.

Referring now to FIG. 7, the velocity of the mass transfer point moving through the inlet, first intermediate, second intermediate, and outlet ceramic honeycomb structures 110, 130, 140, 120 of the reactor 200 for a constant mass flow rate of $CO_2$ is depicted. The inlet ceramic honeycomb structure 110 has an inlet mass transfer velocity 118, the first intermediate ceramic honeycomb structure 130 has a first intermediate mass transfer velocity 138, the second intermediate ceramic honeycomb structure 140 has a second intermediate mass transfer velocity 148, and the outlet ceramic honeycomb structure 120 has an outlet mass transfer velocity 128. The inlet, first intermediate, second intermediate, and outlet velocities 118, 138, 148, 128 increase sequentially, because of a sequential reduction in $CO_2$ adsorbing material, corresponding to greater movement of the mass transfer zone through each of the ceramic honeycomb structures. Thus, the inlet mass transfer velocity 118 is less than the first intermediate mass transfer velocity 138, which is less than the second intermediate mass transfer velocity 148, which is less than the outlet mass transfer velocity 128.

Computer-based modeling of the reactors 100 having a plurality of ceramic honeycomb structures has shown that controlling the distribution of $CO_2$ adsorbing material along the length of the reactor 100. In one such computer model, a reactor 100 having three ceramic honeycomb structures, an inlet ceramic honeycomb structure 110, a first intermediate honeycomb structure 130, and an outlet ceramic honeycomb structure 120 was compared with a baseline reactor 90 having $CO_2$ adsorbing material uniformly distributed along the length of the ceramic honeycomb structure. All variables were held constant other than distribution of $CO_2$ adsorbing material within the ceramic honeycomb structures. The ceramic honeycomb structures were modeled as if made from a combination of zeolite type 13X and cordierite having a density of 1190 kg/m3. The ceramic honeycomb structure was modeled as if it had a length of 4 meters and a diameter of 1 meter. The fluid stream was modeled to operate at 50 bar pressure and a 10%-wt $CO_2$ concentration, with the balance natural gas, entering the fluid inlet of the reactor 100. The reactor 100 according to the present disclosure included $CO_2$ adsorbing material that was 200% of the baseline reactor 90 over the inlet-side 40% of total length of the ceramic honeycomb structure, 50% of the baseline reactor 90 over the intermediate 30% of total length of the ceramic honeycomb structure, and 25% of the baseline reactor 90 over the outlet-side 30% of the total length of the ceramic honeycomb structure, such that the rector 100 according to the present disclosure had 2.5% greater $CO_2$ adsorbing material than the baseline reactor 90.

The model was solved for isothermal conditions, and the rate of $CO_2$ adsorption was assumed to be constant with the percent of ceramic honeycomb structure saturation, such that the adsorption rate slows as the ceramic honeycomb structure approaches saturation. Modeling results illustrated that the reactor 100 according to the present disclosure exhibited a greater time before breakthrough of $CO_2$ at the fluid outlet of the reactor 100 as compared with the baseline reactor 90, as well as greater breakthrough to complete saturation (see FIG. 5), as compared with the baseline reactor 90. Thus, modeling results indicate that the reactor 100 according to the present disclosure utilizes $CO_2$ adsorbing material more efficiently than a baseline reactor 90 that uniformly distributes the same amount of $CO_2$ adsorbing material.

While discussion hereinabove has been directed to reactors for adsorbing CO2 from a fluid stream, it should be understood that similar techniques may be applied to improve efficiency of selectively capturing other components from a fluid stream. Such other components may be captured by varying the active materials of the ceramic honeycomb structures.

It should be understood that reactors according to the present disclosure may incorporate any of a variety of number of ceramic honeycomb structures, depending on the requirements of a particular end-user application. Accordingly, some embodiments of reactors may have multiple ceramic honeycomb structures that have similar amounts of $CO_2$ adsorbing material, such that the amount of $CO_2$ adsorbed by at least two ceramic honeycomb structures within a reactor are the same, along with the velocity of the mass transfer point through at least two ceramic honeycomb structures.

A plurality of reactors 100, 200 may be "ganged" together to suit the requirements of a particular end-user application. The fluid stream may be directed to pass through one of the plurality of reactors, which adsorbs $CO_2$ from the fluid stream. Simultaneously, the reactors to which the fluid stream is diverted away from may undergo a "degassing" operation, wherein $CO_2$ adsorbed by the reactor is desorbed from the $CO_2$ adsorbing material and flushed from the reactor. As reactors within the gang become saturated with $CO_2$, the fluid stream may be diverted from the saturated reactors and directed into the unsaturated reactors. Thus, by ganging a plurality of reactors together, $CO_2$ can be captured from a fluid stream for an indefinite period of time.

It should now be understood that reactors according to the present disclosure allow for more efficient use of $CO_2$ adsorbing material by distributing the $CO_2$ adsorbing material non-uniformly along the axial length of the reactor. The ceramic honeycomb structures positioned inside the reactor housing can be selected to provide increased efficiency in adsorption of $CO_2$, while managing costs associated with the reactor.

It should be understood that the present disclosure includes various aspects.

In a first aspect, the disclosure provides a reactor for adsorbing $CO_2$ from a fluid stream, the reactor comprising: a reactor housing comprising a fluid inlet and a fluid outlet; an inlet ceramic honeycomb structure positioned inside the reactor housing at a position proximate to the fluid inlet, wherein:

the inlet ceramic honeycomb structure has a plurality of partition walls extending in an axial direction thereby forming a plurality of flow channels; the inlet ceramic honeycomb structure comprises a material that forms bonds with $CO_2$ to adsorb the $CO_2$, wherein the inlet ceramic honeycomb structure adsorbs an inlet quantity of $CO_2$; and an outlet ceramic honeycomb structure positioned inside the reactor housing at a position axially offset from the inlet ceramic honeycomb structure and proximate to the fluid outlet of the reactor housing, wherein: the outlet ceramic honeycomb structure has a plurality of partition walls extending in the axial direction thereby forming a plurality of flow channels; the outlet ceramic honeycomb structure comprises a material that forms bonds with $CO_2$ to adsorb the $CO_2$, wherein the outlet ceramic honeycomb structure adsorbs an outlet quantity of $CO_2$, wherein the inlet quantity of $CO_2$ adsorbed by the inlet ceramic honeycomb structure is greater than the outlet quantity of $CO_2$ adsorbed by the outlet ceramic honeycomb structure.

In a second aspect, the disclosure provides a reactor for adsorbing $CO_2$ from a fluid stream, the reactor comprising: a reactor housing comprising a fluid inlet and a fluid outlet; an inlet ceramic honeycomb structure positioned inside the reactor housing at a position proximate to the fluid inlet, wherein: the inlet ceramic honeycomb structure has a plurality of partition walls extending in an axial direction thereby forming a plurality of flow channels; the inlet ceramic honeycomb structure comprises a material that forms bonds with $CO_2$ to adsorb the $CO_2$ such that the inlet ceramic honeycomb structure has an inlet mass transfer velocity; and an outlet ceramic honeycomb structure positioned inside the reactor housing at a position axially offset from the inlet ceramic honeycomb structure and proximate to the fluid outlet of the reactor housing, wherein: the outlet ceramic honeycomb structure has a plurality of partition walls extending in the axial direction thereby forming a plurality of flow channels; and the outlet ceramic honeycomb structure comprises a material that forms bonds with $CO_2$ to adsorb the $CO_2$ such that the outlet ceramic honeycomb structure has an outlet mass transfer velocity, wherein, for a constant mass flow rate of a fluid stream containing $CO_2$, the inlet mass transfer velocity is greater than the outlet mass transfer velocity.

In a third aspect, the disclosure provides a method of removing $CO_2$ from a fluid stream comprising: introducing the fluid stream to a reactor, wherein the reactor comprises a reactor housing having a fluid inlet and a fluid outlet, an inlet ceramic honeycomb structure positioned inside the reactor housing at a position proximate to the fluid inlet of the reactor housing, and an outlet ceramic honeycomb structure positioned inside the reactor housing at a position axially offset from the inlet ceramic honeycomb structure and proximate to the fluid outlet of the reactor housing, wherein the inlet ceramic honeycomb structure and the outlet ceramic honeycomb structure have a plurality of partition walls extending in an axial direction thereby forming a plurality of flow channels and comprise a material that forms bonds with $CO_2$ to adsorb the $CO_2$, the inlet and outlet ceramic honeycomb structures comprise material that forms bonds with $CO_2$ to adsorb the $CO_2$, the inlet and the outlet ceramic honeycomb structures are capable of adsorbing an inlet quantity and an outlet quantity of $CO_2$, respectively, and the inlet quantity of $CO_2$ is greater than the outlet quantity of $CO_2$; flowing the fluid stream from the fluid inlet to the fluid outlet of the reactor housing such that the fluid stream flows through the inlet ceramic honeycomb structure and the outlet ceramic honeycomb structure, wherein the inlet ceramic honeycomb structure and the outlet ceramic honeycomb structure have an affinity for $CO_2$; sensing a chemical composition of a portion of the fluid stream flowing out of the fluid outlet of the reactor housing; and terminating the fluid stream from flowing into the reactor when $CO_2$ breakthrough is sensed.

In a fourth aspect, the disclosure provides the reactor of any of the first or third aspects further comprising a first intermediate ceramic honeycomb structure positioned inside the reactor housing at an axial position between the inlet ceramic honeycomb structure and the outlet ceramic honeycomb structure, wherein the first intermediate ceramic honeycomb structure has a plurality of partition walls extending in the axial direction thereby forming a plurality of flow channels; the first intermediate ceramic honeycomb structure comprises a material that forms bonds with $CO_2$ to adsorb the $CO_2$, wherein the first intermediate ceramic honeycomb structure adsorbs a first intermediate quantity of $CO_2$, and the first intermediate quantity of $CO_2$ adsorbed by the first intermediate ceramic honeycomb structure is greater than the outlet quantity of $CO_2$ adsorbed by the outlet ceramic honeycomb structure and less than the inlet quantity of $CO_2$ adsorbed by the inlet ceramic honeycomb structure.

In a fifth aspect, the disclosure provides the reactor of the fourth aspect further comprising a second intermediate ceramic honeycomb structure positioned inside the reactor housing at an axial position between the first intermediate ceramic honeycomb structure and the outlet ceramic honeycomb structure, wherein the second intermediate ceramic honeycomb structure has a plurality of partition walls extending in the axial direction thereby forming a plurality of flow channels; the second intermediate ceramic honeycomb structure comprises a material that forms bonds with $CO_2$ to adsorb the $CO_2$, wherein the second intermediate ceramic honeycomb structure adsorbs a second intermediate quantity of $CO_2$, and the second intermediate quantity of $CO_2$ adsorbed by the second intermediate ceramic honeycomb structure is greater than the outlet quantity of $CO_2$ adsorbed by the outlet ceramic honeycomb structure and less than the first intermediate quantity of $CO_2$ adsorbed by the first intermediate ceramic honeycomb structure.

In a sixth aspect, the disclosure provides the reactor of any of the first through fifth aspects, wherein the inlet ceramic honeycomb structure and the outlet ceramic honeycomb structure are discrete components.

In a seventh aspect, the disclosure provides the reactor of any of the first through fifth aspects, wherein the inlet ceramic honeycomb structure and the outlet ceramic honeycomb structure are continuous components.

In a seventh aspect, the disclosure provides the reactor of any of the first through seventh aspects, wherein an inlet pressure drop of the fluid stream passing through the inlet ceramic honeycomb structure is greater than an outlet pressure drop of the fluid stream passing through the outlet ceramic honeycomb structure.

In an eighth aspect, the disclosure provides the reactor of any of the fourth through seventh aspects, wherein an inlet pressure drop of the fluid stream passing through the inlet ceramic honeycomb structure is greater than an outlet pressure drop of the fluid stream passing through the outlet ceramic honeycomb structure, and a first intermediate pressure drop of the fluid stream passing through the first intermediate ceramic honeycomb structure is greater than the outlet pressure drop and less than the inlet pressure drop.

In a ninth aspect, the disclosure provides the reactor of any of the first through eighth aspects, wherein the inlet ceramic honeycomb structure comprises a first adsorbent material.

In a tenth aspect, the disclosure provides the reactor of any of the first through ninth aspects, wherein the outlet ceramic honeycomb structure comprises the first adsorbent material, and the outlet ceramic honeycomb structure has a lower saturation limit per unit volume than the inlet ceramic honeycomb structure.

In an eleventh aspect, the disclosure provides the reactor of any of the first through ninth aspects, wherein the outlet ceramic honeycomb structure comprises a second adsorbent material different than the first adsorbent material, and the second adsorbent material has a lower saturation limit per unit volume than the first adsorbent material.

In a twelfth aspect, the disclosure provides the reactor of any of the first through eleventh aspects, wherein the first adsorbent material is deposited on the plurality of partition walls of the inlet ceramic honeycomb structure and the outlet ceramic honeycomb structure as a functional coating, and a thickness of the functional coating on the inlet ceramic honeycomb structure is greater than a thickness of the functional coating on the outlet ceramic honeycomb structure.

In a thirteenth aspect, the disclosure provides the reactor of any of the first through twelfth aspects, wherein the plurality of partition walls of the inlet ceramic honeycomb structure have an inlet average minimum thickness, the plurality of partition walls of the outlet ceramic honeycomb structure have an outlet average minimum thickness, and the inlet average minimum thickness is greater than the outlet average minimum thickness.

In a fourteenth aspect, the disclosure provides the reactor of any of the first through thirteenth aspects, wherein the inlet ceramic honeycomb structure has an inlet cell density, the outlet ceramic honeycomb structure has an outlet cell density, and the inlet cell density is greater than the outlet cell density.

In a fifteenth aspect, the disclosure provides the reactor of any of the first through fourteenth aspects, wherein the plurality of partition walls of the inlet ceramic honeycomb structure have an inlet average minimum thickness, the plurality of partition walls of the outlet ceramic honeycomb structure have an outlet average minimum thickness, and the inlet average minimum thickness is less than the outlet average minimum thickness.

In a sixteenth aspect, the disclosure provides the reactor of the second aspect further comprising a first intermediate ceramic honeycomb structure positioned inside the reactor housing at an axial position between the inlet ceramic honeycomb structure and the outlet ceramic honeycomb structure, wherein the first intermediate ceramic honeycomb structure has a plurality of partition walls extending in the axial direction thereby forming a plurality of flow channels; the first intermediate ceramic honeycomb structure comprises a material that forms bonds with $CO_2$ to adsorb the $CO_2$ such that the first intermediate ceramic honeycomb structure has a first intermediate mass transfer velocity, wherein for the constant mass flow rate of $CO_2$, the first intermediate mass transfer velocity is greater than the inlet mass transfer velocity and less than the outlet mass transfer velocity.

In a seventeenth aspect, the disclosure provides the reactor of the sixteenth aspect further comprising a second intermediate ceramic honeycomb structure positioned inside the reactor housing at an axial position between the first intermediate ceramic honeycomb structure and the outlet ceramic honeycomb structure, wherein the second intermediate ceramic honeycomb structure has a plurality of partition walls extending in the axial direction thereby forming a plurality of flow channels; the second intermediate ceramic honeycomb structure comprises a material that forms bonds with $CO_2$ to adsorb the $CO_2$ such that the second intermediate ceramic honeycomb structure has a second intermediate mass transfer velocity, wherein the second intermediate mass transfer velocity is greater than the first intermediate mass transfer velocity and less than the outlet mass transfer velocity.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A reactor for adsorbing $CO_2$ from a fluid stream, the reactor comprising:
    a reactor housing comprising a fluid inlet and a fluid outlet;
    an inlet ceramic honeycomb structure positioned inside the reactor housing at a position proximate to the fluid inlet, wherein:
        the inlet ceramic honeycomb structure has a plurality of partition walls extending in an axial direction thereby forming a plurality of flow channels; and
        the inlet ceramic honeycomb structure comprises a substrate and a first material that forms bonds with $CO_2$ to adsorb the $CO_2$, the first material having a first average thickness on the plurality of partition walls of the inlet ceramic honeycomb structure, wherein the inlet ceramic honeycomb structure is capable of adsorbing an inlet quantity of $CO_2$; and
    an outlet ceramic honeycomb structure positioned inside the reactor housing and proximate to the fluid outlet of the reactor housing, wherein:
        the outlet ceramic honeycomb structure has a plurality of partition walls extending in the axial direction thereby forming a plurality of flow channels; and
        the outlet ceramic honeycomb structure comprises a substrate and a second material that forms bonds with $CO_2$ to adsorb the $CO_2$, the second material having a second average thickness on the plurality of partition walls of the outlet ceramic honeycomb structure, wherein the outlet ceramic honeycomb structure is capable of adsorbing an outlet quantity of $CO_2$, wherein the first average thickness of the first material is greater than the second average thickness of the second material, wherein the inlet adsorbed quantity of $CO_2$ is greater than the outlet adsorbed quantity of $CO_2$.

2. The reactor of claim 1 further comprising a first intermediate ceramic honeycomb structure positioned inside the reactor housing at an axial position between the inlet ceramic honeycomb structure and the outlet ceramic honeycomb structure, wherein
    the first intermediate ceramic honeycomb structure has a plurality of partition walls extending in the axial direction thereby forming a plurality of flow channels; and
    the first intermediate ceramic honeycomb structure comprises a material that forms bonds with $CO_2$ to adsorb the $CO_2$, wherein the first intermediate ceramic honeycomb structure is capable of adsorbing a first intermediate quantity of $CO_2$, and the first intermediate adsorbed quantity of $CO_2$ is greater than the outlet adsorbed quantity of $CO_2$ and less than the inlet adsorbed quantity of $CO_2$.

3. The reactor of claim 2 further comprising a second intermediate ceramic honeycomb structure positioned inside the reactor housing at an axial position between the first intermediate ceramic honeycomb structure and the outlet ceramic honeycomb structure, wherein
the second intermediate ceramic honeycomb structure has a plurality of partition walls extending in the axial direction thereby forming a plurality of flow channels; and
the second intermediate ceramic honeycomb structure comprises a material that forms bonds with $CO_2$ to adsorb the $CO_2$, wherein the second intermediate ceramic honeycomb structure is capable of adsorbing a second intermediate quantity of $CO_2$, and the second intermediate adsorbed quantity of $CO_2$ is greater than the outlet adsorbed quantity of $CO_2$ and less than the first intermediate adsorbed quantity of $CO_2$.

4. The reactor of claim 2, wherein an inlet pressure drop of the fluid stream passing through the inlet ceramic honeycomb structure is greater than an outlet pressure drop of the fluid stream passing through the outlet ceramic honeycomb structure, and a first intermediate pressure drop of the fluid stream passing through the first intermediate ceramic honeycomb structure is greater than the outlet pressure drop and less than the inlet pressure drop.

5. The reactor of claim 1, wherein the inlet ceramic honeycomb structure and the outlet ceramic honeycomb structure are discrete components.

6. The reactor of claim 1, wherein the inlet ceramic honeycomb structure and the outlet ceramic honeycomb structure are continuous components.

7. The reactor of claim 1, wherein an inlet pressure drop of the fluid stream passing through the inlet ceramic honeycomb structure is greater than an outlet pressure drop of the fluid stream passing through the outlet ceramic honeycomb structure.

8. The reactor of claim 1, wherein the first material and the second material are the same, and the outlet ceramic honeycomb structure has a lower saturation limit per unit volume than the inlet ceramic honeycomb structure.

9. The reactor of claim 1, wherein the plurality of partition walls of the inlet ceramic honeycomb structure have an inlet average minimum thickness, the plurality of partition walls of the outlet ceramic honeycomb structure have an outlet average minimum thickness, and the inlet average minimum thickness is greater than the outlet average minimum thickness.

10. The reactor of claim 1, wherein the inlet ceramic honeycomb structure has an inlet cell density, the outlet ceramic honeycomb structure has an outlet cell density, and the inlet cell density is greater than the outlet cell density.

11. The reactor of claim 10, wherein the plurality of partition walls of the inlet ceramic honeycomb structure have an inlet average minimum thickness, the plurality of partition walls of the outlet ceramic honeycomb structure have an outlet average minimum thickness, and the inlet average minimum thickness is less than the outlet average minimum thickness.

12. The reactor of claim 1, wherein the outlet ceramic honeycomb structure is positioned inside the reactor housing at a position axially offset from the inlet ceramic honeycomb structure.

13. A reactor for adsorbing $CO_2$ from a fluid stream, the reactor comprising:
a reactor housing comprising a fluid inlet and a fluid outlet;
an inlet ceramic honeycomb structure positioned inside the reactor housing at a position proximate to the fluid inlet, wherein:
the inlet ceramic honeycomb structure has a plurality of partition walls extending in an axial direction thereby forming a plurality of flow channels;
the inlet ceramic honeycomb structure comprises a substrate and a first material that forms bonds with $CO_2$ to adsorb the $CO_2$ the first material having a first average thickness on the plurality of partition walls of the inlet ceramic honeycomb structure, such that the inlet ceramic honeycomb structure has an inlet mass transfer velocity; and
an outlet ceramic honeycomb structure positioned inside the reactor housing and proximate to the fluid outlet of the reactor housing, wherein:
the outlet ceramic honeycomb structure has a plurality of partition walls extending in the axial direction thereby forming a plurality of flow channels; and
the outlet ceramic honeycomb structure comprises a substrate and a second material that forms bonds with $CO_2$ to adsorb the $CO_2$ the second material having a second average thickness on the plurality of partition walls of the outlet ceramic honeycomb structure such that the outlet ceramic honeycomb structure has an outlet mass transfer velocity, wherein the first average thickness of the first material is greater than the second average thickness of the second material, wherein, for a constant mass flow rate of a fluid stream containing $CO_2$, the inlet mass transfer velocity is greater than the outlet mass transfer velocity.

14. The reactor of claim 13 further comprising a first intermediate ceramic honeycomb structure positioned inside the reactor housing at an axial position between the inlet ceramic honeycomb structure and the outlet ceramic honeycomb structure, wherein
the first intermediate ceramic honeycomb structure has a plurality of partition walls extending in the axial direction thereby forming a plurality of flow channels; and
the first intermediate ceramic honeycomb structure comprises a material that forms bonds with $CO_2$ to adsorb the $CO_2$ such that the first intermediate ceramic honeycomb structure has a first intermediate mass transfer velocity, and for the constant mass flow rate of the fluid stream containing $CO_2$, the first intermediate mass transfer velocity is greater than the inlet mass transfer velocity and less than the outlet mass transfer velocity.

15. The reactor of claim 14 further comprising a second intermediate ceramic honeycomb structure positioned inside the reactor housing at an axial position between the first intermediate ceramic honeycomb structure and the outlet ceramic honeycomb structure, wherein
the second intermediate ceramic honeycomb structure has a plurality of partition walls extending in the axial direction thereby forming a plurality of flow channels; and
the second intermediate ceramic honeycomb structure comprises a material that forms bonds with $CO_2$ to adsorb the $CO_2$ such that the second intermediate ceramic honeycomb structure has a second intermediate mass transfer velocity, and for the constant mass flow rate of the fluid stream containing $CO_2$, the second intermediate mass transfer velocity is greater than the first intermediate mass transfer velocity and less than the outlet mass transfer velocity.

16. The reactor of claim 13, wherein the inlet ceramic honeycomb structure and the outlet ceramic honeycomb structure are discrete components.

17. The reactor of claim 13, wherein the inlet ceramic honeycomb structure and the outlet ceramic honeycomb structure are continuous components.

18. The reactor of claim 13, wherein the outlet ceramic honeycomb structure is positioned inside the reactor housing at a position axially offset from the inlet ceramic honeycomb structure.

19. A reactor for adsorbing $CO_2$ from a fluid stream, the reactor comprising:
   a reactor housing comprising a fluid inlet and a fluid outlet;
   an inlet ceramic honeycomb structure including a first end and a second end opposite the first end, the inlet ceramic honeycomb structure positioned inside the reactor housing at a position proximate to the fluid inlet, wherein:
      the inlet ceramic honeycomb structure has a plurality of partition walls extending in an axial direction from the first end to the second end thereby forming a plurality of flow channels; and
      the inlet ceramic honeycomb structure comprises a substrate and a first material that adsorbs the $CO_2$, the first material having a first average thickness on the plurality of partition walls from the first end to the second end of the inlet ceramic honeycomb structure, wherein the inlet ceramic honeycomb structure is capable of adsorbing a first quantity of $CO_2$; and
   an outlet ceramic honeycomb structure positioned inside the reactor housing proximate to the fluid outlet of the reactor housing, wherein:
      the outlet ceramic honeycomb structure has a plurality of partition walls extending in the axial direction thereby forming a plurality of flow channels of the outlet ceramic honeycomb structure; and
      the outlet ceramic honeycomb structure including a first end and a second end opposite the first end, the outlet ceramic honeycomb structure comprises a substrate and a second material that adsorbs the $CO_2$, the second material having a second average thickness on the plurality of partition walls from the first end to the second end of the outlet ceramic honeycomb structure, wherein the outlet ceramic honeycomb structure is capable of adsorbing a second quantity of $CO_2$; and
   wherein the first average thickness of the first material is greater than the second average thickness of the second material, wherein the first adsorbed quantity of $CO_2$ is greater than the second adsorbed quantity of $CO_2$.

20. The reactor of claim 19, wherein the first material and second material are the same, wherein the first average thickness of the first material adsorbs a greater quantity of the $CO_2$ from the fluid stream than the second material.

* * * * *